Dec. 23, 1941.  R. M. ROOKE  2,267,288

GOGGLE-SPECTACLES

Filed Nov. 10, 1939

INVENTOR.
Robert M. Rooke
BY
*J. H. Brandenburg*
ATTORNEY.

Patented Dec. 23, 1941

2,267,288

UNITED STATES PATENT OFFICE 2,267,288

GOGGLE-SPECTACLES

Robert M. Rooke, Jersey City, N. J., assignor to Air Reduction Company, Incorporated, New York, N. Y., a corporation of New York Application November 10, 1939, Serial No. 303,721

2 Claims. (Cl. 88—41)

This invention relates to goggle-spectacles such as used by welders to protect their eyes from glare and flying sparks.

It is an object of the invention to provide improved goggle-spectacles for welders, and to make the improved goggle-spectacles simple, inexpensive, and convenient to use.

The extreme intensity of the light developed by welding operations makes it necessary to use protecting lenses that are quite dark. Whenever a weld is finished, or the operation interrupted, the welder moves the goggles away from his eyes in order to see better. Sometimes the goggles are taken off entirely, but with spectacle-type goggles that hook behind the wearer's ears, it is most convenient to push the goggle-spectacles up on the forehead. When in that position they can quickly and easily be pulled back into position in front of the eyes whenever the welding is to be resumed.

One feature of the invention relates to a spacer pad on the goggle-spectacles frame in position to contact with the forehead of the wearer and to hold the lenses of the goggle-spectacles out of contact with the wearer's skin so that the lenses do not become greasy or fogged from perspiration. This feature is particularly advantageous for welding goggles because the heat developed by the welding causes the welder to perspire even in mild weather.

Another feature of the invention relates to the construction of the spacer pad of rubber, or like material, that develops sufficient friction with the wearer's forehead to keep the goggles in their raised position even though the skin is moist and therefore somewhat slippery.

Another advantage of the invention is that the spacer pad prevents the goggle-spectacles from contacting with and scratching the lenses of corrective-vision glasses which the welder may have to wear behind his goggles.

Other objects, features and advantages of the invention will appear or be pointed out as the specification proceeds.

In the accompanying drawing, forming a part hereof:

Figure 1:
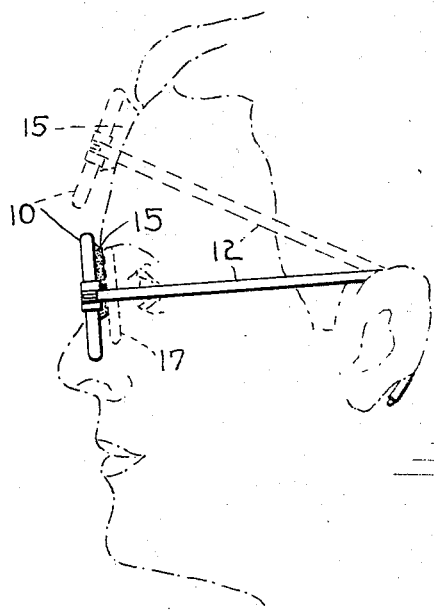
Fig. 1 is a side elevation showing goggle-spectacles embodying this invention, and showing the way in which the devices may be worn over other glasses and may be pushed up on the forehead when not in use.
Figure 2:
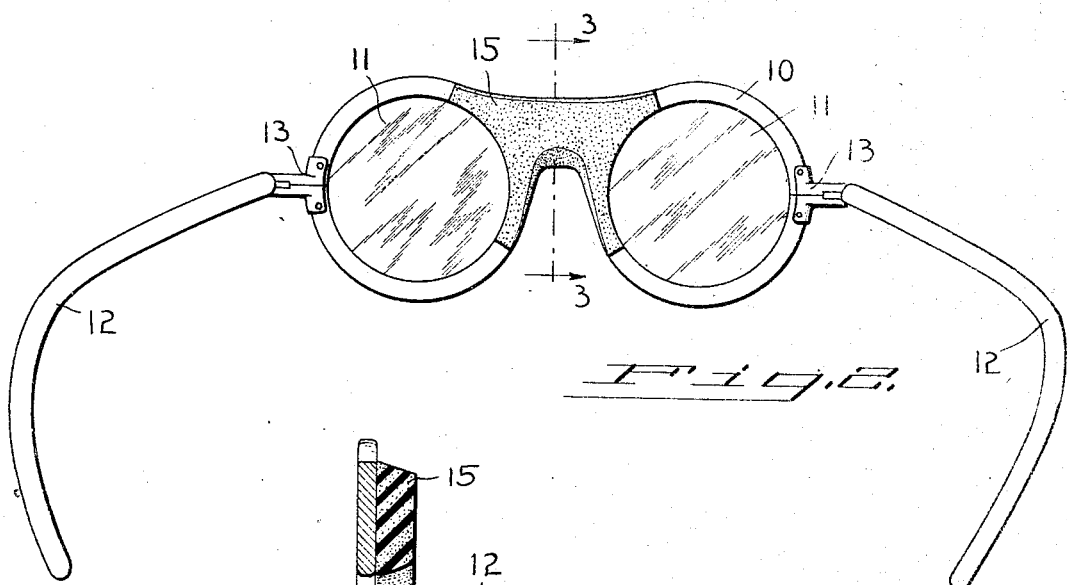
Fig. 2 is an enlarged, rear, perspective view of the goggle-spectacles shown in Fig. 1.
Figure 3:
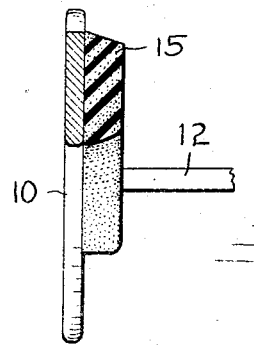
Fig. 3 is an enlarged sectional view taken on the line 3—3 of Fig. 2.

The goggle-spectacles shown in the drawing have a frame 10 that is preferably stiff and that holds lenses 11. Bows 12 for hooking over the ears of the wearer are connected to the frame 10 by hinges 13.

On the back of the central or bridge portion of the frame 10 there is a spacer pad 15, which is preferably made of sponge rubber, or similar material.

The pad 15 is secured to the back of the frame 10 by vulcanizing or by suitable adhesive, such as glue. In the illustrated embodiment of the invention this pad extends down along that part of the frame which is adjacent the wearer's nose when the spectacles are in use. The pad 15 extends across only a limited part of the top of the frame, however, so as not to block the passage of air behind the lenses.

The pad 15 bears against the upper part of the nose or against the lower forehead of the wearer when the goggle-spectacles are in use, as shown in full lines in Fig. 1. The purpose of the downwardly extending portions of the pad 15 is to contact with the frame or the inner part of the lenses of vision-correcting glasses 17 that the welder may wear behind the goggles. With the pad 15 against the glasses 17 it is impossible for the frame or lenses of the goggle-spectacles to touch or scratch the lenses of the vision glasses 17, even though the glasses 17 have spherical lenses.

The pad 15 has a thickness, when not compressed, of the order of ¼ inch, and the invention can be made without the downwardly extending portions of the pad adjacent the wearer's nose. The thickness of the pad across the bridge of the frame is sufficient to hold the goggle-spectacles away from the lenses of glasses 17 in most cases, but the downwardly extending portions of the pad provide positive insurance against scratching of the vision lenses.

By terminating the pad 15 only a short distance beyond the bridge portion of the frame 10, and leaving space for air to circulate behind the goggle-spectacles, fogging of the goggle lenses is prevented.

Upon completion of a welding operation, the welder can push the goggle-spectacles up on his forehead into a position such as that indicated by dotted lines in Fig. 1. In this position, the pad 15 bears against the wearer's forehead and keeps the lenses of the goggle-spectacles far enough away from the skin to prevent them from becoming smeared or fogged by perspiration.

The sponge rubber of which the pad 15 is made in the preferred embodiment of the invention has sufficient friction with the forehead, even when the skin is wet with perspiration, to prevent the goggle-spectacles from sliding down.

This invention has been described in connection with goggle-spectacles for welders. Although particularly advantageous for welders' goggles because of the working conditions encountered in welding, the invention is not limited to such use. Changes and modifications can be made in the illustrated embodiment without departing from the invention as defined in the claims.

I claim:

1. Goggle-spectacles for welders including a stiff frame, dark lenses held in said frame, bows hinged to the frame and formed with curved ends that hook over the ears of a wearer, and a sponge rubber spacer pad secured to the back of the stiff frame along the bridge portion of said frame and along the central portion of the frame that is adjacent the nose of the wearer when the spectacles are in use, said pad terminating close to the opposite sides of the bridge portion of the frame so that air can rise behind the lenses and keep the space behind the lenses ventilated, said pad having an uncompressed thickness of the order of ¼ inch so that it holds the lenses sufficiently spaced from the wearer's skin to prevent fogging when the spectacles are pushed up on the wearer's forehead.

2. Goggle-spectacles including a stiff frame, lenses held in said frame, bows hinged to the frame and formed with curved ends that hook over the ears of a wearer, and a spacer pad having the compressible resilient and surface friction qualities of sponge rubber secured to the back of the stiff frame along the bridge portion of said frame in position to bear against the front of the frame of vision-correcting glasses, or against the inner part of the lenses of the vision-correcting glasses, in the region of the bridge portion of such glasses to hold the goggle-spectacles out of contact with the lenses of the corrective glasses, said pad terminating close to the opposite sides of the bridge portion of the frame so that air can rise behind the lenses and keep the space behind the lenses ventilated, said pad having at least a portion of its area located in position to contact with the forehead of the wearer when the spectacles are pushed up from in front of the eyes, and having sufficient thickness when in use to hold the spectacle lenses substantially spaced from the wearer's skin to prevent fogging when the spectacles are pushed up on the wearer's forehead.

ROBERT M. ROOKE.